Figure 1:
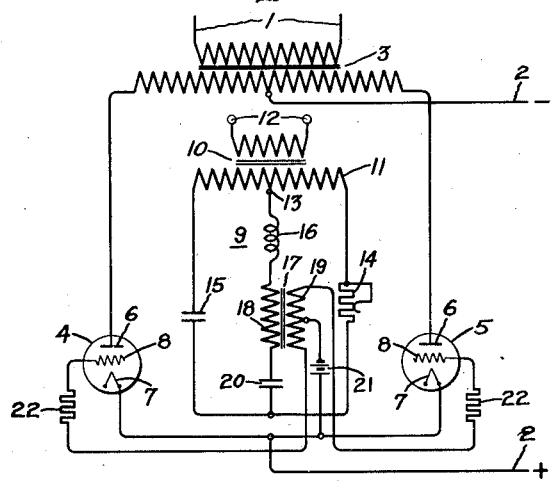

Dec. 27, 1938.  E. SCHRÖTER  2,141,937

ELECTRIC PHASE SHIFTING CIRCUITS

Filed Aug. 12, 1936

Inventor:
Erich Schröter,
by Harry E. Dunham
His Attorney.

Patented Dec. 27, 1938

2,141,937

UNITED STATES PATENT OFFICE 2,141,937

ELECTRIC PHASE SHIFTING CIRCUITS

Erich Schröter, Berlin-Charlottenburg, Germany, assignor to General Electric Company, a corporation of New York Application August 12, 1936, Serial No. 95,566
In Germany October 25, 1935

4 Claims. (Cl. 250—27)

My invention relates to electric phase shifting circuits and more particularly to phase shifting circuits of the static type for controlling electric valve means.

In electric valve translating circuits, particularly in circuits including electric valve means of the type employing ionizable mediums such as gases or vapors, it has been found desirable and expedient to control these electric valve means by varying the phase of the potentials impressed on the control members. Where such apparatus is employed it is customary to control the transmission of power between direct current and alternating current systems or between alternating current circuits by shifting the phase of the potentials applied to the control members of the electric valves with respect to the anode potentials. Various arrangements have been provided heretofore to effect this phase shift of the control member potentials. Static phase shifting arrangements, that is electric circuits including various combinations of resistances, inductances and capacitances, have proved to be very satisfactory and highly desirable from the standpoint of simplicity, economy and reliability. In certain of these static phase shifting arrangements where the load imposed on the phase shifting arrangements has been predominately inductive, the effective range over which the potential may be shifted has been materially limited. In view of this sacrifice in the available range of application for phase shifters of this type, there has been a decided need for inexpensive and simple arrangements for utilizing the complete range of phase control even though a highly inductive load is imposed on the phase shifting circuits.

Heretofore where inductive loads have been supplied by phase shifting circuits of the type including a serially-connected resistance and a reactive element, such as a capacitance or an inductance, the available range over which the output potential could be shifted has been materially limited by the inductive current which flows in the phase shifting circuit. For example, in phase shifting circuits of the type using a source of potential and means for providing a potential intermediate the potential of the source, these phase shifting circuits have failed to provide the maximum available phase shift range of 180 electrical degrees due to the inductive current which tends to decrease the phase shift range by an appreciable angle. Because of this limitation, it has been found difficult to obtain smooth and continuous control in the range between the zero phase displacement position and the 90 electrical degree lagging position.

It is an object of my invention to overcome the disadvantages above noted in connection with static phase shifting circuits and to provide a circuit in which the maximum phase shift of certain static phase shifting circuits may be obtained even though a highly inductive load may be connected to the phase shifting circuit.

It is another object of my invention to provide a new and improved excitation circuit for electric valve translating means whereby a periodic potential of peaked wave form is provided and whereby the periodic potential may be varied over a range of 180 electrical degrees by the exclusive continuous variation of only one of the elements in the circuit.

It is a further object of my invention to provide a new and improved static phase shifting arrangement and excitation circuit for electric valve means whereby the control potential impressed on the control member of the electric valve means is substantially peaked in wave form and whereby the phase of the potential may be shifted through 180 electrical degrees by the exclusive variation of only one of the elements in the phase shifting circuit.

In accordance with the illustrated embodiment of my invention, I provide an excitation circuit for electric valve means in which the potentials impressed on the control members of the associated electric valves may be shifted through 180 electrical degrees by the exclusive continuous variation of only one element of the phase shifting circuit. The excitation circuit comprises a source of alternating potential including a winding having terminal connections and a connection electrically intermediate the terminal connections. A phase shifting circuit including a serially-connected resistance and a reactive element, such as a capacitance, is connected across the terminal connections of the winding. A circuit including a serially-connected unsaturable inductance, a saturable transformer and a capacitance is connected between the electrically intermediate connections of the above mentioned winding and the juncture of the resistance and the reactive element. Due to the action of the unsaturable inductance and the saturable transformer, the potential appearing across the secondary winding of the saturable transformer will be of substantially peaked wave form. By virtue of the compensating effect of the capacitance connected in series with the unsaturable inductance and the saturable transformer, it is possible by this arrangement to vary the phase of the peaked potential 180 electrical degrees relative to the potential of the source.

For a better understanding of my invention, reference may be had to the following description taken in connection with the accompanying drawing and its scope will be pointed out in the appended claims.

Figure 2:
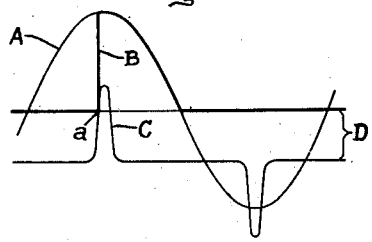

Fig. 1 of the accompanying drawing diagrammatically represents an embodiment of my invention as applied to an electric valve translating system and Fig. 2 represents certain operating characteristics of the embodiment of my invention shown in Fig. 1.

Referring now to Fig. 1 of the accompanying drawing, my invention is diagrammatically shown as applied to an electric valve translating system for transmitting energy between an alternating current circuit 1 and a direct current circuit 2 through a transformer 3 and any suitable electric valve aggregate such as electric valves 4 and 5, preferably of the type employing ionizable mediums such as gases or vapors. Each of the electric valves 4 and 5 is provided with an anode 6, a cathode 7 and a control member 8. In order to control the conductivity of the electric valves 4 and 5, I provide an excitation circuit 9 comprising a source of alternating potential supplied by a secondary winding 11 of a transformer 10. The transformer 10 may be energized from any suitable source of alternating potential 12 of the same frequency as the alternating current circuit 1. If so desired, the transformer 10 may be energized from the alternating current circuit 1 through any conventional phase shifting arrangement. The secondary winding 11 of transformer 10 is provided with terminal connections and an electrically intermediate connection 13 to supply a potential intermediate the potential of the secondary winding 11. A phase shifting circuit including a serially-connected resistance 14 and a reactive element, such as a capacitance 15, is connected across the terminal connections of the secondary winding 11 of transformer 10. If desired, I may use an inductance instead of the capacitance 15. In order to provide a voltage of peaked wave form, I employ an unsaturable inductance 16 and a saturable inductive device such as a saturable transformer 17 having a primary winding 18 and a secondary winding 19. A capacitance 20 is connected in series relation with the inductance 16 and the primary winding 18 of transformer 17 to compensate for the inductive reactance occasioned by the inductance 16 and the saturable transformer 17. By suitable dimensioning of the inductance 16 and the capacitance 20, the range of phase shift which is attainable by the exclusive continuous variation of the resistance 14 may be considerably increased. The periodic potential of peaked wave form induced in the secondary winding 19 of transformer 17 is impressed on the control members 8 of electric valves 4 and 5 to control the conductivity of these valves. Any suitable biasing means such as a battery 21 is connected in the excitation circuit to impress on the control members 8 a negative biasing potential. Current limiting resistors 22 are connected in series with the control members 8 of electric valves 4 and 5.

Although in Fig. 1 of the accompanying drawing I have chosen to represent diagrammatically my invention as applied to a bi-phase rectifier, it should be understood that my invention in its broader aspects may be applied to electric valve translating circuits generally where any electric valve aggregate is employed to transmit energy between alternating and direct current systems or between alternating current systems of the same or different frequencies.

The general principles of operation of the embodiment of my invention diagrammatically shown in Fig. 1 may be better understood by considering the electric valve translating system when energy is being transmitted from the alternating current circuit 1 to the direct current circuit 2. As will be well understood by those skilled in the art, electric valves 4 and 5 will alternately conduct current to supply direct current to the circuit 2. If the electric valves 4 and 5 are of the type employing ionizable mediums, it is to be understood that the potential impressed on the control members 8 of these valves is effective to render the electric valves conductive and that after the valves have been rendered conductive the control members are ineffective to render the valves non-conductive. In order to control the average voltage impressed on the direct current circuit 2 by the electric valves 4 and 5, the phase of the potentials impressed on the control members 8 is varied relative to the potentials impressed on the anodes of these valves. As is well understood by those skilled in the art, the maximum potential impressed on the direct current circuit 2 is obtained when there is substantial phase coincidence between the voltages impressed on the control members 8 and the voltages impressed on the anodes 6. As the potentials impressed on the control members 8 are retarded in phase, the average value of voltage impressed on the direct current circuit 2 will be decreased and at the point of substantial phase opposition between the potentials impressed on the respective control members 8 and the anodes 6, the voltage impressed on the direct current circuit 2 will be substantially zero.

By means of the phase shifting circuit including the serially-connected resistance 14 and the capacitance 15, there is provided an alternating potential variable in phase relative to the potentials impressed on the anodes 6 of electric valves 4 and 5. By varying the value of the resistance 14, the potential appearing between the intermediate connection 13 and the juncture of the resistance 14 and the capacitance 15, and hence the potentials impressed on control members 8, may be shifted through 180 electrical degrees relative to the potentials impressed on the anodes 6. When the value of the resistance 14 is relatively large, the potentials impressed on the control members 8 are substantially 180 electrical degrees out of phase with the potentials impressed on the respective anodes 6. As the value of resistance 14 is decreased, the phase of the control member potentials is advanced and as the value of resistance 14 approaches zero these potentials obtain positions of substantial phase coincidence with the potentials impressed on the respective anodes 6. Due to the inherent inductive reactance of the unsaturable inductance 16 and saturable transformer 17, I have found that the available range of phase shift in circuits of this type has been materially limited and in accordance therewith I have provided a means, such as a capacitance 20, which compensates for this inductive reactance and tends to cause the current flowing through this branch of the circuit to be more nearly in phase with the potential appearing between the intermediate connection 13 and the juncture of the resistance 14 and capacitance 15. In this manner, the complete 180 electrical degree phase shift range is available for electric valve control purposes.

In Fig. 2 of the accompanying drawing there are represented certain operating characteristics of the electric valve translating circuit shown in Fig. 1. Curve A represents the voltage impressed between the anode and cathode of one of the electric valves, for example electric valve 4, and the heavy curve B represents the voltage which electric valve 4 impresses on the load circuit 2. Curve C represents the voltage of peaked wave form impressed on control member 8 of electric valve 4 by means of the lower half of secondary winding 19 of transformer 17 and the displacement D represents the negative biasing potential introduced in the control or excitation circuit by means of the battery 21. As will be understood by those skilled in the art, when the potentials impressed on the control members 8 of electric valve 4 obtain a predetermined minimum value corresponding to the point a, the electric valve 4 will be rendered conductive and will be maintained conductive to supply unidirectional current to the direct current circuit 2 until the potential of the anode 6 becomes negative relative to the potential of the cathode 7.

By virtue of the above described phase shifting and excitation circuit, the potentials of peaked wave form as represented by curve C of Fig. 2 may be varied through 180 electrical degrees by the exclusive continuous variation in resistance element 14, thereby providing an arrangement for effecting a smooth and continuous control of electric valve means without employing apparatus of an expensive or complicated nature.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. In combination, a source of alternating potential, means for establishing a point of intermediate potential of said source, a phase shifting circuit comprising a serially-connected resistance and a reactive element connected across said source, inductive means connected to be energized from said point of intermediate potential and a point of said phase shifting circuit for providing a voltage of peaked wave form, and a capacitive element associated with said inductive means to permit said voltage of peaked wave form to be varied over a range of 180 electrical degrees with respect to the voltage of said source by the exclusive variation of said resistance.

2. In combination, a source of alternating potential, means for establishing a point of intermediate potential of said source, a phase shifting circuit connected across said source and comprising a serially-connected resistance and a reactive element, and means energized in accordance with the potential appearing between said point of intermediate potential and the juncture of said resistance and said reactive element and comprising a serially-connected inductance, a saturable inductive device for providing a voltage of peaked wave form and a capacitance to permit said voltage of peaked wave form to be varied substantially 180 electrical degrees with respect to the voltage of said source by the exclusive variation of said resistance.

3. In combination, a source of alternating potential including a winding having terminal connections and an intermediate connection, a serially-connected resistance and capacitance connected across said terminal connections, and means for providing a voltage of peaked wave form variable in phase over a range of 180 electrical degrees by the exclusive variation of said resistance comprising a serially-connected inductance, a saturable transformer and a capacitance connected between said intermediate connection and the juncture of said resistance and said first mentioned capacitance.

4. In combination, an electric circuit, an electric valve means associated with said circuit and having a control member, and an excitation circuit for energizing said control member comprising a source of alternating potential, means for obtaining a point of intermediate potential of said source, a phase shifting circuit connected across said source comprising a serially-connected resistance and a reactive element, and means connected between said point of intermediate potential and the juncture of said resistance and said reactive elements comprising a serially-connected inductance, a saturable inductive device for providing a voltage of peaked wave form and a capacitance to permit said voltage of peaked wave form to be varied substantially 180 electrical degrees with respect to the voltage of said source by the exclusive variation of said resistance.

ERICH SCHRÖTER.